May 1, 1956   J. G. LIVINGSTONE   2,743,844
POURING SPOUT WITH CAP AND DRIP RETURN
Original Filed Dec. 1, 1949   5 Sheets-Sheet 1

INVENTOR.
JAY G. LIVINGSTONE
BY
Gordon C. Mack
ATTORNEY

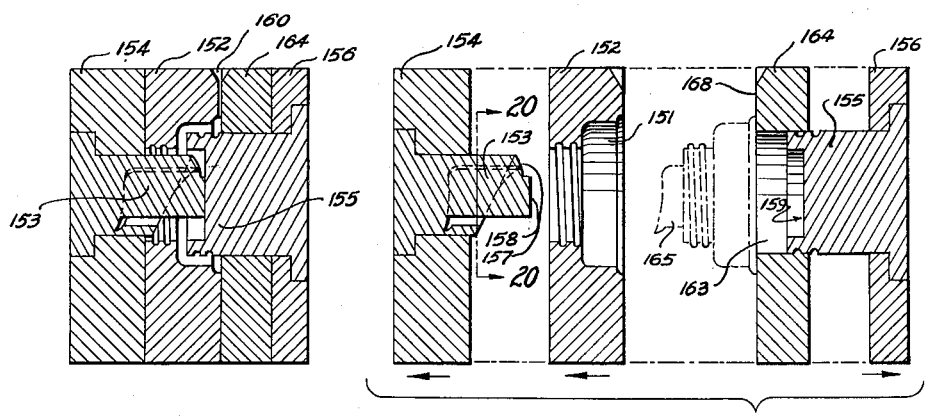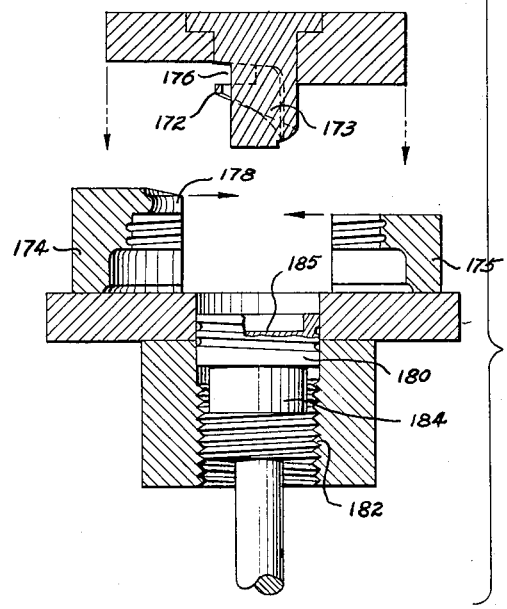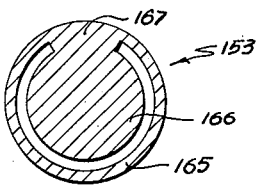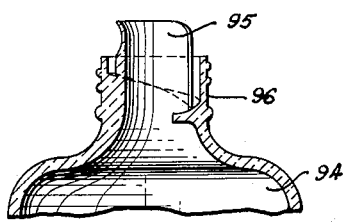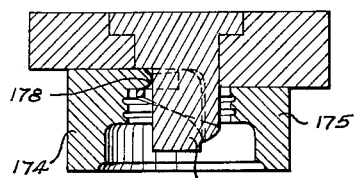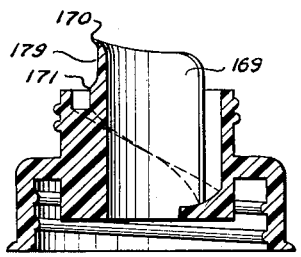
INVENTOR.
Jay G. Livingstone
BY
Gordon C. Mack
ATTORNEY

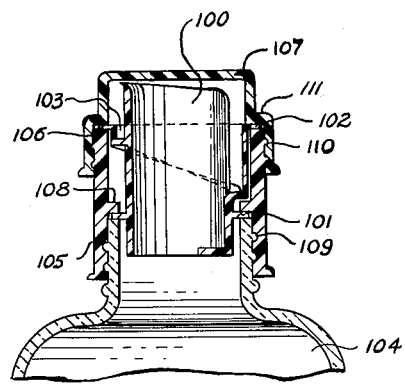
fig.-13
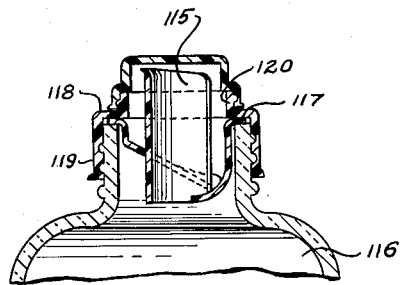
fig.-14
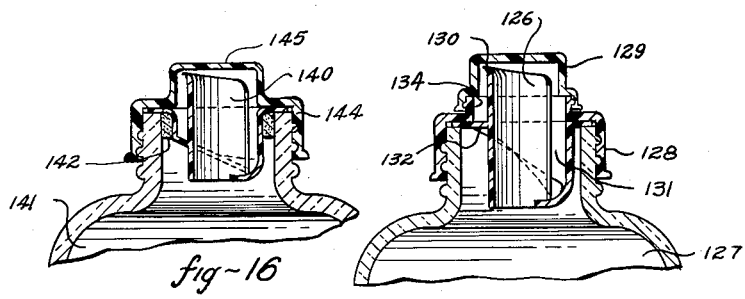
fig.-16
fig.-15
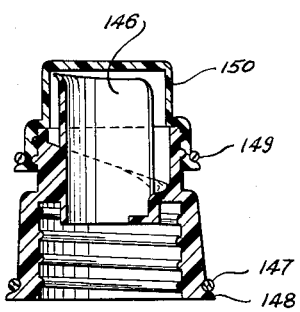
fig.-17
INVENTOR.
JAY G. LIVINGSTONE
BY
ATTORNEY May 1, 1956 J. G. LIVINGSTONE 2,743,844
POURING SPOUT WITH CAP AND DRIP RETURN
Original Filed Dec. 1, 1949 5 Sheets-Sheet 4
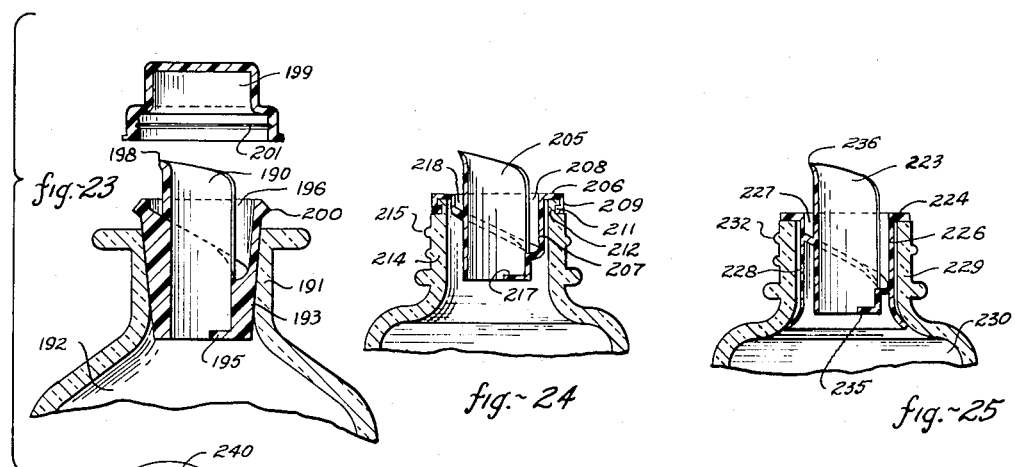
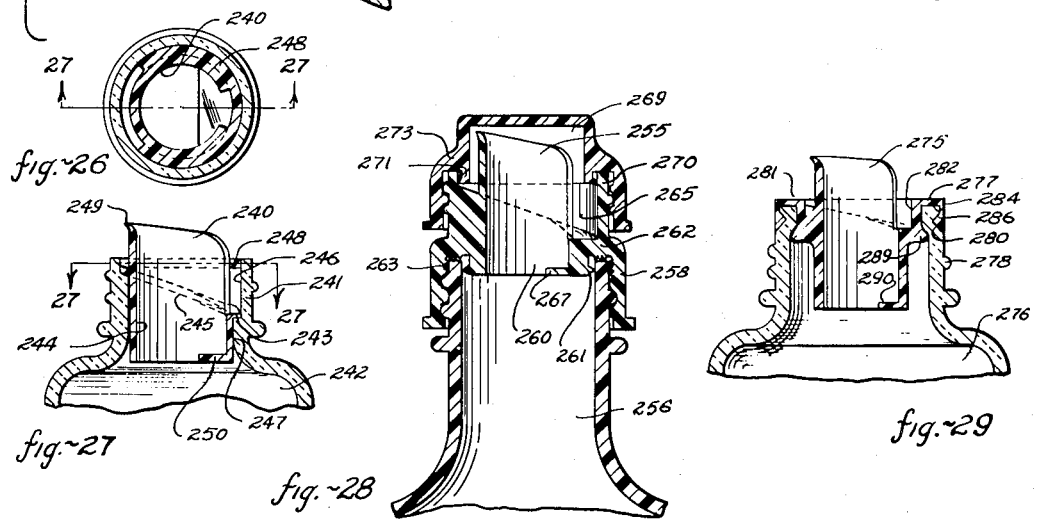
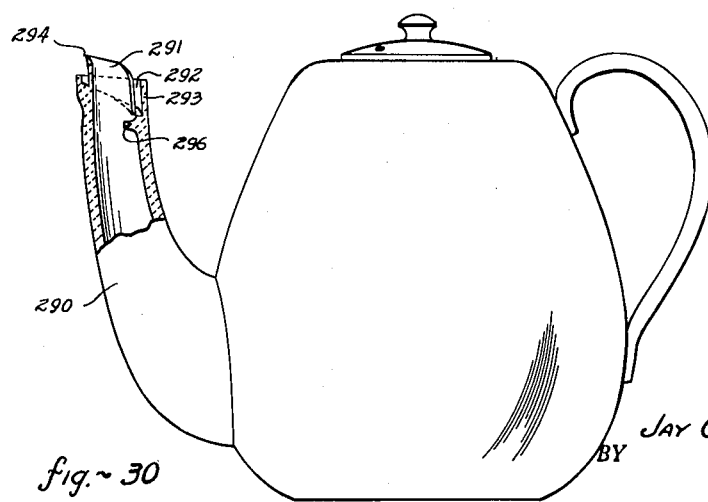
INVENTOR.
Jay G. Livingstone
BY
Gordon C. Mack
ATTORNEY May 1, 1956 J. G. LIVINGSTONE 2,743,844
POURING SPOUT WITH CAP AND DRIP RETURN
Original Filed Dec. 1, 1949 5 Sheets-Sheet 5

INVENTOR.
Jay G. Livingstone
BY
Gordon C. Mack
ATTORNEY

United States Patent Office 2,743,844
Patented May 1, 1956

2,743,844

POURING SPOUT WITH CAP AND DRIP RETURN

Jay Gould Livingstone, Akron, Ohio

Original application December 1, 1949, Serial No. 130,432, now Patent No. 2,601,039, dated June 17, 1952. Divided and this application May 27, 1952, Serial No. 290,227

16 Claims. (Cl. 222—111)

This invention relates to an improved pouring spout for bottles or other vessels containing liquids, vessels equipped with the new spout, and molds used in manufacturing the spout.

The spout is designed to prevent liquid from running down or collecting on the outside of the vessel after a pouring operation is completed. A closure cap is provided which in combination with the spout returns to the vessel all liquid splashed or spilled from the vessel into the pouring spout as soon as the vessel is brought to an upright position after being shaken or upset.

This improved spout comprises an outlet passage for liquid surrounded, preferably concentrically, by a channel which slopes downwardly to the back of the spout. When the vessel is tilted to pouring position liquid flows along the front side of the outlet passage toward a pouring lip at its outer end. The opposite side or back of the outlet passage is open at least at the bottom. This opening connects the channel with the interior of the passage and the vessel. When a pouring operation is completed and the vessel is returned to the upright position, the channel collects the liquid which drips from the pouring lip or runs down the outside surface of the outlet passage and returns it by gravity flow through the said opening in the back of the outlet passage to the interior of the vessel.

The closure cap fits tightly onto or around the wall of the channel. If the covered vessel is upset, all liquid spilled from it is collected in the cap. When the vessel is returned to the upright position, the liquid in the cap drains into the channel and is returned to the vessel through the opening at the back of the pouring outlet. When the cap is subsequently removed for pouring, the outlet and channel are as free of liquid as though the vessel had not been upset.

There is a baffle in the throat of the spout below the opening which connects the channel with the interior of the vessel. The baffle is located at the back of the throat. Its forward edge is preferably straight and usually this edge will be horizontal when the vessel is tilted for pouring so that air enters the vessel under it in small bubbles and causes minimum disturbance to the even outward flow of the liquid. The baffle constricts the stream of liquid passing into the outlet passage from the vessel and prevents it from spilling into the channel through the aforesaid opening.

The spout of this invention is capable of handling any liquid regardless of its surface tension, viscosity, or other physical properties. It works equally well with milk, water, whiskey, oils, and sirups. There are no small vents or passages in it to become clogged by deposits of crystalline material, etc. which may be deposited by liquids poured from it.

In a preferred form of the invention the spout is formed as an adapter to be fastened to a bottle, etc. It may be disposable and be designed to be used once and then destroyed; or it may be of lasting construction and be removed when the bottle is emptied and fastened to another bottle. It may be designed with various means for fastening it to a bottle or other vessel. Adapters may be molded from plastic, for example, polyethylene, polystyrene, etc. and used on bottles containing acids, solvents, etc. to which the plastic is inert. For milk bottles an adapter made of paraffin-coated, pressed paper will ordinarily be satisfactory. The spout may be of glass and be formed integrally into the neck of a bottle or vessel. The spout may be made of metal, etc. A ceramic teapot and glass bottle are disclosed, both of which have the spout of this invention.

The molds used in forming a plastic adapter include a cavity for shaping the outside surface of the adapter and a core which enters the cavity from one side thereof and is adapted to shape the interior of the outlet passage and the return channel surrounding it. The end of this core is stepped to shape the upper side of the baffle. For an adapter which is to be fastened to a bottle or vessel by a skirt another core is provided in the opposite side of the molding cavity to shape the interior of the skirt and the bottom of the baffle. When two cores are used, their ends abut each other inside the cavity. Two types of molds are disclosed, one to be used for a stretchable plastic, such as polyethylene, and the other to be used for non-stretchable plastics, such as polystyrene. The block for the molding cavity for molding of polyethylene is made in one piece whereas the block for polystyrene is formed in sections which can be moved apart to permit removal of a finished article.

The drawings include illustrations of various preferred spouts. In the drawings—

Fig. 11 is a cross section of another spout;

Fig. 12 is a cross section of a bottle with a spout formed integrally therewith;

Figs. 13 to 16 are cross-sectional views of spouts fastened on bottles by fastening means not integral with the spout;

Fig. 17 shows a cross section through a reinforced spout and cap;

Fig. 18 is a cross-sectional view of a mold for forming the spout shown in Fig. 8, the elements of the mold being closed;

Fig. 19 is a cross-sectional view of the mold shown in Fig. 18, the elements of the mold being in open position;

Fig. 20 is an enlarged view taken on the line 20—20 of Fig. 19;

Fig. 21 is a cross-sectional view of a mold for forming the spout shown in Fig. 11, the elements of the mold being in open position;

Fig. 22 is a cross-sectional view showing the assembly of the top core and cavity sections of Fig. 21;

Fig. 23 is a cross-sectional view through a spout designed particularly for a laboratory bottle or the like;

Fig. 24 is a cross-sectional view through another spout;

Fig. 25 is a cross-sectional view through a spout with a flexible interior skirt;

Fig. 26 is a top view of the neck of a bottle with a modified spout frictionally fitted therein;

Fig. 27 is a cross-sectional view taken on line 27—27 of Fig. 26;

Fig. 28 is a cross section through a spout for a plastic bottle;

Fig. 29 is a cross section through another modified spout;

Fig. 30 is a side elevation of a teapot with the spout of this invention;

Fig. 31 is a view showing separate elements of a pressed paper spout for a milk bottle or the like;

Figure 1:
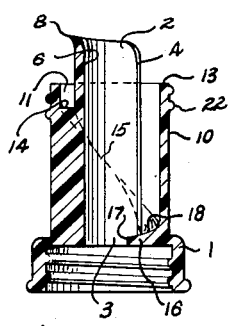
Fig. 1 is a cross-sectional view of a vertical pouring spout.

The spout shown in Fig. 1 is formed with an internally threaded skirt 1 which is adapted to be screwed on to the threads at the top of an ordinary bottle. Outlet passage 2 rises from the throat 3 of the spot. The throat 3 is located substantially in the center of the top of the skirt. The outlet passage is formed along the back with a narrow slot 4 which extends from its top edge to its base. One purpose of this slot is to give the spout a relatively fixed direction of pour. It is simpler to mold than an enclosed opening, as will be more fully explained.

When the bottle is tilted to pouring position, liquid will flow along the front 6 of the outlet passage and over the pouring lip 8 at its upper edge. Pouring lip 8 extends outwardly from the top edge of side 6 and blends into the vertical sides of the outlet passage at numeral 9. The front edge is sharp and the outside wall of the outlet under the lip is undercut sharply. When the bottle is brought to an upright position this sharp, undercut lip tends to break the stream of liquid flowing over it and thereby reduces the amount of liquid apt to overflow or drip therefrom. The bottle may be twisted while pouring so that a stream of liquid will pour over any portion of lip 8 between the points 9.

Wall 10 surrounds the lower portion of the outlet passage 2, preferably concentrically. This wall forms with the outlet passage a substantially annular channel 11. The outlet passage extends above the top edge 13 of the wall so that liquid can be easily poured from it. Channel 11 is very shallow at the front of the spout at point 14, directly under the pouring lip 8, and its bottom 15 spirals symmetrically downward on each side of the outlet passage to the slot 4 near the base of the outlet passage.

The throat 3 of the spout through which the liquid must pass as it flows from a bottle, etc. into the outlet passage is of smaller area than the cross-sectional area of the passage. The size of the throat is determined by the baffle 16 which closes a segment of the throat at the back of the spout below the outlet passage, under the slot 4. The forward edge 17 of the baffle is preferably straight although it may be curved or finely serrated. The upper surface 18 of this baffle is dished toward the center of the baffle and the bottom 15 of the channel blends smoothly into the top of the baffle at each side of the slot or opening 4.

When a pouring operation is completed, any liquid which drips from the lip 8 as the bottle is returned to upright position and would hit the outside of the bottle, and any liquid which runs down the outside of the outlet passage, is caught by the channel 11 at point 14. It flows by gravity along the steeply inclined bottom 15 of the channel around each side of the outlet passage and then through the slot or opening 4 onto the dished side 18 of the baffle from which it drains back into the bottle. The channel is sufficiently wide at the front to catch any drops which would hit the bottle, and its bottom is inclined sufficiently to return the collected liquid quickly to the bottle. It is important that the channel empty quickly in order to prevent liquid from spilling out of the channel on a subsequent pour.

Air must enter the bottle to replace liquid poured out of it. If the throat is circular and the bottle is tipped sufficiently to fill the throat with liquid, the air enters as large bubbles, and the liquid issues in spurts. The baffle prevents this in the spout of this invention. When the bottle is tilted, preferably it is held so that the forward edge 17 of the baffle is substantially horizontal although a smooth flow will issue from the spout even if the edge 17 is inclined away from horizontal during the pouring. Air enters the bottle under this baffle in a series of small bubbles with minimum disturbance of the flowing liquid. The liquid issues in a smooth stream with minimum spattering. The baffle performs the further function of preventing liquid from issuing through the spout in sufficient quantity to overflow through the slot 4 into the channel and be poured over the front edge of wall 10.

Figure 2:
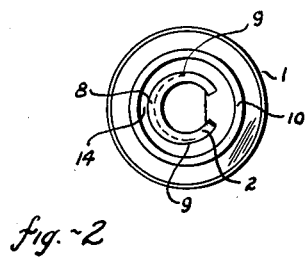
Fig. 2 is a top view of the spout shown in Fig. 1.
Figure 6:
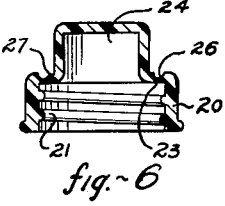
Fig. 6 is a cross-sectional view of a preferred closure cap for the spouts.

The closure cap shown in Fig. 6 is formed with a skirt 20 having internal threads 21 which are adapted to engage threads 22 located around the top of the wall 10 of the spout shown in Figs. 1 and 2. The top edge 13 of this wall is designed to seal against the inside surface 23 of this closure cap. The offset section 24 of the closure cap encloses the top portion of the outlet passage 2 which projects above the wall 10. Preferably, the closure cap is provided with an annular recess 26 in the outer surface of the wafer portion 27 which flexes upwardly when the cap is tightened, giving a tight seal all around the edge 13 of the wall even though the edge is not perfectly flat.

If the bottle should be upset when closed with the closure cap, any liquid which flows through slot 4 or out the end of the outlet passage is caught in the cap. The only surfaces in addition to the inner surface of the cap which can be wet by this liquid are the walls of the outlet passage and the channel. When the bottle is righted the liquid drains from these surfaces and from the inner surface of the cap, down the channel and back into the bottle through slot 4. All of the spilled liquid is thus returned to the bottle. Then, when the cap is removed the liquid is poured from the bottle as though none had been spilled. None of the spilled liquid reaches any outer surface of the cap, spout or bottle.

Figure 3:
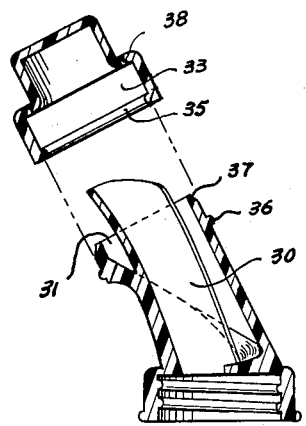
Fig. 3 is a cross-sectional view of an inclined pouring spout.

The spout 30 shown in Fig. 3 operates on the same principle and is structurally the same as the spout shown in Fig. 1, except that the outlet passage and the wall surrounding it are inclined rather than vertical. It will be noted in Fig. 3 that the material thickness under the high point 31 of the channel's bottom is reduced to save material. The closure cap 33 shown above spout 30 in Fig. 3 is similar in shape to the closure cap shown in Fig. 6, except that it is adapted for a friction fit rather than to be threaded on to the spout. Annular bead 35 located around the inside edge of this cap is adapted to snap over the outwardly protruding bead 36 formed near the top of the wall of the spout 30. Preferably, the upper edge 37 is bevelled somewhat to fit into a complementary groove 38 in the wafer portion of the cap 33 to give an improved seal.

Either the cap shown in Fig. 6 or the cap 33 of Fig. 3 may be used interchangeably on any of the spouts shown, assuming that the spout is provided with threads or a bead, as necessary. Either cap may be made with or without a groove such as groove 38 of Fig. 3 to receive the top edge of the outlet passage.

In the spout shown in Fig. 4 the outlet passage 40 extends below the top of the skirt 41. The slot 42 which corresponds to the slot 4 of Fig. 1 extends only as far as the top of the skirt 41. The bottom 43 of the channel 44 around the outlet passage 40 leads to the bottom of the slot. Baffle 46 is located under the slot but at the bottom of the outlet passage. The throat of this spout fits down inside the neck of the bottle on which the spout is fastened.

Figure 5:
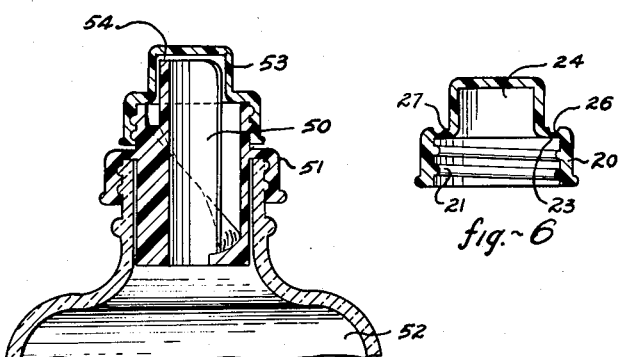
Fig. 5 is a cross-sectional view of another spout, illustrating it positioned in a bottle.

Fig. 5 shows a spout structurally similar to the spout shown in Fig. 1, except that the lower half of the outlet passage 50 extends downwardly from the threaded skirt 51 into the neck of the bottle 52 so that the throat of the spout is located well down inside the bottle's neck. There is very little of the spout protruding above the top of the bottle. This figure also shows a closure cap 53 which is similar to the cap shown in Fig. 6. The skirt may be located at any height around the outside wall of the channel. This spout withstands rough treatment during shipment. The upper edge 54 of the outlet passage 50 of this spout is flat rather than being turned outwardly to form a lip such as the lip 8 in Fig. 1. The spouts are preferably formed with an outwardly turned lip although they are operative to prevent liquid from running down the sides of a bottle even without the outwardly turned lip.

Figure 7:
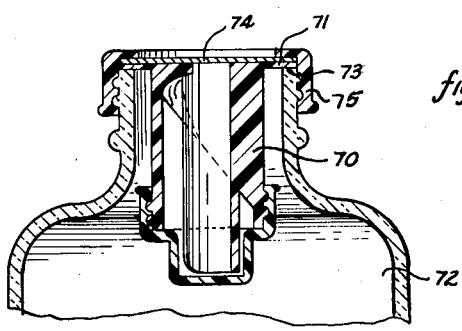
Fig. 7 is a cross-sectional view of another form of the spout on a bottle.

The spout of Fig. 7 is particularly designed to conserve space in shipping and elsewhere. Spout 70 is similar in structure to the spout shown in Figs. 1 and 2, except that it has no skirt portion but is provided with an annular flange 71 which extends outwardly from the bottom of the spout. For shipment, the spout is inverted and slipped inside the neck of the bottle 72 with the flange 71 resting on the upper edge 73 of the neck of the bottle. A thin wafer 74, which may be of plastic or cardboard, etc., is laid across the bottom of the spout to protect its interior. A cap 75 is then threaded on to the neck of the bottle. By unscrewing the cap 75 the spout may be removed from the neck of the bottle and placed in an upright position. The center of the top of cap 75 is open and is adapted to fit down over the outlet passage and hold the flange 71 firmly on the top of the bottle.

Figure 4:
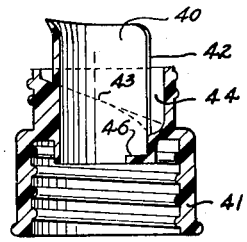
Fig. 4 shows a cross section of a modification of the spout shown in Fig. 1 in which the lip of the spout is nearer the bottle and a longer skirt is provided.
Figure 8:
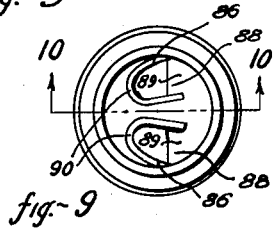
Fig. 8 shows a cross section of another spout.

The spout shown in Fig. 8 is similar to the spout shown in Fig. 5, except that the throat 80 and the baffle 81 are located between the top and bottom of the skirt 82, a pouring lip 84 is provided, and the lower end of the channel leads to the baffle instead of to the level of the top of the skirt as in the spout shown in Fig. 4.

Figure 9:
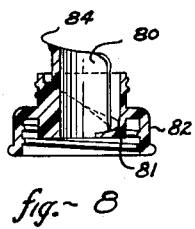
Fig. 9 is a top view of another spout.
Figure 10:
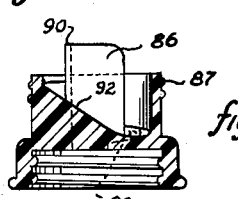
Fig. 10 is a view on the line 10—10 of Fig. 9.

The spout shown in Figs. 9 and 10 is provided with two outlet passages 86 which are surrounded by a wall 87. The back of each outlet passage 86 is open at 88 and each passage is provided with a baffle 89. Liquid is adapted to pour over the edge 90 of each passage. The two streams will merge into a single smooth stream shortly after the liquid leaves the outlet passages. A channel 91 returns the liquid between the passages to the openings 88 at the back of the outlet passages. The bottom 92 of this channel is inclined downwardly from a point near the front of the passages to the openings 88 at the back. This spout may be advantageously formed integrally into the neck of a ceramic tea-pot or pitcher if desired.

Figure 12 illustrates a cross section of a bottle 94 formed of any suitable material. The spout 95 (structurally similar to the spout of Fig. 1) is formed as an integral portion of neck 96 of the bottle.

Figures 13 to 16 illustrate spouts each designed with separate means for fastening it to the neck of a bottle. Each of these spouts is provided with an outlet passage open at the back, a return channel, and baffle, and functions in the same manner as the spouts previously described. These spouts are lighter and require less material than the spouts previously described.

Spout 100 (Fig. 13) is provided with an annular, outwardly extending flange 101 near its bottom and another similar flange 102 around the top of its channel 103. This spout is fastened in the neck of a bottle 104 by a cylindrical fitting 105 which is assembled with the spout so that flange 102 is in contact with edge 106 of the closure cap 107 and flange 101 is below an annular flange 108 inside the fitting. The lower portion of the fitting is provided with internal threads 109 which screw onto corresponding threads on the neck of the bottle. Flange 108 seals flange 101 of the spout against the top of the bottle's neck. The upper portion of the fitting is provided with external threads 110 onto which the closure cap 107 is screwed. The wall of cap 107 is stepped so that portion 111 presses the flange 102 tightly against edge 106 of the fitting and makes a tight seal. To pour from the bottle, only cap 107 is removed. This spout must be formed of a flexible material to permit its assembly with fitting 105. Fitting 105 and cap 107 may be of the same material as the spout or each may be a hard, non-yielding plastic, or metal.

Spout 115 of Fig. 14 fits into the neck of a bottle 116 and is provided with an annular, outwardly directed flange 117 around the top of its channel. This flange rests on the top of the bottle's neck and is sealed thereon by portion 118 of a fitting 119 which is screwed onto the neck of the bottle. The top of this fitting is provided with an annular, upwardly directed flange 120 onto the outside of which cap 121, having an offset head, is screwed to close the bottle. Flange 120 has substantially the same diameter as the outer wall of the spout's channel so that this flange does not interfere with the flow of liquid which is collected in the channel.

Spout 126 of Fig. 15 is fastened to bottle 127 by a fitting 128 and covered by a cap 129. These are similar to the fitting and cap shown in Fig. 14. On this spout, however, there is no channeled portion immediately under lip 130. Channel 131 begins at each side of point 132 and extends downwardly to the opening at the back. Flange 134 of the fitting 128 cooperates with the spout at point 132 to form a suitable channel under the lip to collect liquid.

In Fig. 16, spout 140 (similar to spout 115 of Fig. 14) is frictionally fitted into the neck of bottle 141 by an annular stopper 142. Such a stopper may be cork, rubber, etc. Frictional engagement may be also effected by a flange formed integrally with the outside of the spout which flange would engage with the inside surface of the bottle's neck. This embodiment is particularly advantageous for wide-mouth bottles. A closure cap 144 having an offset portion 145 is used to close the bottle. This cap is screwed directly to the neck of the bottle and when it is removed the spout will be retained in the bottle by stopper 142.

In bottling plants equipped for mass production, closures such as caps, spouts, etc. which are to be screwed onto the bottles are usually applied by mechanical tightening devices. These machines are generally designed to frictionally grip the closure, tighten it on the threads of a bottle, and then release the closure after it has been tightened sufficiently. It has been found that a closure formed from a stretchable plastic such as polyethylene may, when being tightened on a bottle by such a machine, stretch when the limit of the threads thereon is reached so that the threads of the closure are turned over the threads on the bottle and, consequently, there will not be a sufficient resistance torque to disengage the tightening machine. This additional turning will cause the closure to "climb" the threads on the bottle and thereby cause an improper seal. Spout 146, shown in Fig. 17, is the same general structure as spout 40 of Fig. 4, however, a metal reinforcing ring 147 is provided above the outside bead 148 at the base of spout 146 to prevent the skirt from stretching and being turned beyond the limit of its threads. Ring 147 is preferably a wire and it is advantageous to form the walls of a skirt on which it is to be used somewhat thicker than the walls of a skirt where no reinforcement is applied. Ring 147 may be molded as an insert into the wall of the skirt if desired. If molded as an insert it is not necessary that the ends of the wire be spliced so long as they overlap. The wire insert may even be wound spirally for several coils in the wall of the skirt. A wire reinforcing ring 149, similar to ring 147 is also provided above the outside bead at the base of closure cap 150 to prevent the cap from being turned over the threads on the spout and to insure a tight seal.

Figures 18 and 19 show a preferred mold for forming the spout shown in Fig. 8 of polyethylene or other flexible plastic. In Fig. 18 the elements of the mold are closed and in Fig. 19 they are opened. The exposed outer surface of the spout, including the threads on the outside of the channel wall are shaped in a cavity 151 formed in solid plate 152, best shown in Fig. 19. The outlet passage, the pouring lip, the top of the baffle, and the inner surfaces of the channel are formed by core 153 which protrudes from movable plate 154. Core 155 which protrudes from movable plate 156 shapes the bottom of the baffle and the threads on the interior of the skirt. The outer face 157 of core 153 is provided with a stepped portion 158 which forms the top of the baffle in the throat of the spout. Cores 153 and 155 move into the cavity 151 from opposite sides. Face 157 of core 152 is flat and abuts against a portion of the flat face 159 of core 155 when the mold is closed. The balance of the face 159 molds the bottom of the baffle. Plastic is injected through sprue 160 when the mold is closed. Core 155 is adapted to slide through a hole 163 in plate 164 which is between plates 152 and 156.

The elements of this mold are brought together as shown in Fig. 18 to mold a spout. The mold opens by moving these plates apart. The movements of these plates may be controlled by conventional molding machines.

Figure 20 shows an enlarged cross-sectional view of core 153. Thin wall 165 shapes the channel of the spout. Cylindrical portion 166 shapes the inside of the outlet passage. The slot is formed by the solid portion 167 of the core.

After the spout has been formed in the mold, plate 154 carrying core 153 is moved away from the remaining plates, thereby withdrawing this core from the interior of the spout. Next, plate 152 is moved away from the two remaining plates 164 and 156, causing the molded spout 165 which remains with plate 164, to pop out of the cavity 151. Plate 164 remains stationary. After the molded spout is snapped free from plate 152, plate 156 which carries core 155 is moved in the other direction away from the stationary plate 164. As core 155 is withdrawn through the hole 163 in stationary plate 164, the rim of the skirt of the molded product is held by the surface 168 of plate 164 and the completed spout 165 is stripped from core 155. The completed spout is now free from the mold and can be disposed of as desired.

Polyethylene has sufficient stretchability and flexibility to permit stripping of the external threads on the outer wall of the channel from the inner wall of cavity 151, and to permit stripping of the internal skirt threads from the core 155. After the stripping operation these threads immediately regain their shape. Since the material is flexible core 153 may be pulled over the pouring lip formed on the spout 165 and the lip is sufficiently flexible to snap back into position after the core is removed.

With this type of mold the baffle may be cut out of the core 155 instead of the core 153. This is not possible in molds of the type shown in Fig. 21 in which the core which molds the inside of the skirt is threaded into the mold. In that type of mold the baffle must be shaped by the upper core which is not threaded.

Polystyrene does not possess sufficient flexibility and stretchability to permit a spout to be stripped from portions of the mold which shape threads and the pouring lip. Therefore, when the spouts are made of polystyrene the pouring lip is modified as is shown in Fig. 11. The mold is designed to permit the molded product to be removed from the mold without injury to the threads. In Fig. 11 the edge of pouring lip 170 is directly above the point 171 at the top of the channel so that wall 172 on core 173 (Figs. 21 and 22) which shapes the channel can be pulled past this edge without interference therefrom as the core is stripped out of a newly molded product.

The mold used for polystyrene is shown with its elements open in Fig. 21. Fig. 22 shows the assembly of core 173 with sections 174 and 175 brought together into mating relation to form a cavity. Core 173 is similar to core 153 of Figs. 18 and 19 except that there is a slot 176 through the wall 172 of this core. Slot 176 is adapted to receive projection 178 located at the upper edge of cavity section 174 as shown in Fig. 22.

The face of projection 178 is adapted to shape the undercut portion 179 of pouring lip 170 on spout 169 (Fig. 11). To remove core 173 after a molding operation, the cavity sections 174 and 175 are moved away from each side of the molded product. As soon as the projection 178 on section 174 is withdrawn from slot 176, core 173 is moved upwardly out of the molded product.

The lower core 180 is similar in shape to core 155. It is adapted to mold the base of the baffle and the threads on the inner surface of the skirt of the spout. However, to separate this core from a finished spout it must be screwed away from the threads inside the skirt. To accomplish this, thread 182 (the pitch of which is equal to the pitch of the thread inside the skirt) is provided on the lower portion of the core, and this lower portion of the core is connected with the upper portion 180 by the cylinder 184. A small portion of the top of the core 180 is broken away in Fig. 21 to show the indentation 185 which receives the lower portion of core 173. The two cores 173 and 180 meet within the skirt-forming cavity in the same manner as cores 153 and 155 in Fig. 18. The core 180 is turned in and out of the lower part of the mold to bring it in and out of contact with core 173.

The molds disclosed are typical of molds for molding spouts having skirts. Molds for spouts such as those shown in Figures 13 to 16 are much simpler, since only one core is required. For flexible plastic the spouts would require only a single cavity which is open at the top to receive a core similar to core 153. For non-flexible plastic the cavity could be made in movable sections with a core similar to core 173 adapted to fit therein.

Fig. 23 shows a plastic spout 190 fitted inside the neck 191 of a laboratory bottle 192. The inside surface of the neck tapers inwardly from a wide portion at the rim and is usually shaped by grinding so that the inside surface is relatively rough. The outer surface 193 of the spout is tapered at the same angle as the taper of the neck and this surface frictionally engages the rough inside surface of the neck. The spout includes a baffle 195 such as previously described and a channel 196 which returns any drip to the interior of the bottle. The pouring lip 198 may be of any usual shape. Cap 199 is adapted to snap over the bead 200 around the top of the outer surface of the spout. The portion of this bead of greatest circumference seats in the groove 201 inside the cap to form a seal when the cap is in place.

In molding, the parting line of the mold is advantageously located half way between this portion of largest circumference and the top outer edge of the wall so that this edge and the portion of the bead of largest circumference will both be perfectly formed and smooth without any irregularities and both will form perfect seals with the inner surface of the cap. The groove 201 is so located in the cap as to exert slight pressure on both these contact points. If gas is developed in the container, when sufficient pressure is generated the cap 199 is lifted sufficiently to permit gas to escape and then the cap reseats itself.

This prevents generation of sufficient pressure to blow the cap off or blow the spout and cap out of the bottle.

The spout 205 of Fig. 24 is of flexible and elastic plastic. The flange 206 extends outwardly from the wall 207 which forms the channel 208. This flange serves as a gasket and eliminates the need for a gasket in a metal or other hard closure cap. The outer edge of the flange is turned down at 209 and provided with a bead 211 around the bottom. This bead fits into a complementary groove 212 in the outer surface of the neck 214 of the bottle. The spout is applied to the neck by snapping the bead into the groove. The spout may be covered by a dome-shaped cap as previously described for other spouts which is threaded onto threads 215 on the outside of the neck. The cap will seal against the top of flange 206. A baffle 217 and a liquid return channel 218 are provided. It is not necessary that the flange and the bead extend continuously around the spout. They may be a number of equally spaced, individual projections and then the grooved portion of the neck will be formed with spline-like recesses to receive the projections. The spout will be fastened to the neck by inserting the projections into the spline-like recesses on the neck and then turning the spout until the projections are interlocked with the grooved portions of the neck between the recesses.

Spout 223 of Fig. 25 is of flexible plastic and is provided with a flange 224 extending outwardly from the upper edge of wall 226 which forms the liquid return channel 227. A flexible skirt 228 extends downwardly from the bottom edge of wall 226 and its bottom portion flares outwardly. The skirt is fitted into the neck 229 of the bottle 230 by collapsing the sides of the flexible skirt and pressing the outwardly flaring bottom 228 through the neck of the bottle. When the spout is in the bottle, flange 224 rests on the rim of the neck and the flaring bottom embraces the base of the neck inside the bottle so that the spout is held tightly in place. A dome-shaped cap as shown with other of the spouts may be threaded onto the threads 232 with the flange 224 serving as a sealing gasket. The channel 227, baffle 235 and pouring lip 236 are as previously described.

Figs. 26 and 27 are two views of a spout 240 which is frictionally fitted inside the neck 241 of a bottle 242. The spout includes a flange 243 which projects outwardly from the pouring tube 244. The flange 243 is inclined downwardly and forms the bottom of the liquid run-back channel. The inner surface of the neck of the bottle is formed with a ledge 245 on which this flange 243 rests when the spout is in the neck. The neck's surface 246 which is above the ledge forms the outer wall of the run-back channel and the surface 247 below the ledge fits tightly against the bottom of the pouring tube 244. To insure a tight frictional engagement of the spout, a bead 248 is provided around the back of the pouring tube. This bead encloses the top of the rear of the channel and fits tightly against the surface 246. It extends around approximately two-thirds of the circumference of the pouring tube, and does not enclose the portion of the channel immediately under pouring lip 249 so that liquid dripping from the lip may enter the channel. A baffle 250 is formed across the base of the pouring tube, and the spout may be covered with a threaded dome-shaped cap.

Fig. 28 shows a spout 255 which is designed particularly for use on a flexible plastic bottle 256. This spout is provided with a skirt 258 which is threaded onto the neck of the bottle. The bottom portion of the pouring tube 260 inside the skirt is provided with an annular bead 261 which presses against the inside surface of the neck of the bottle just below its rim when the skirt is screwed in place. This bead reinforces the neck so that it is not apt to collapse and permit the skirt to be pulled easily over the threads on the outside of the neck. The portion 262 of the spout by which the skirt is connected to the pouring tube is relatively thick and this prevents any appreciable outward bending of the sides of the skirt when the skirt is tightened onto the bottle. The thick portion together with the bead makes it very difficult to turn the skirt beyond the limit of the threads on the neck. The horizontal and vertical surfaces 263 inside the skirt are serrated and these serrations are in contact with the rim and the outside surface of the neck above the threads when the skirt is tightened. These serrations form a tight seal around the rim of the neck. The return channel 265 surrounds the pouring tube in the usual manner and the baffle 267 is provided across the bottom of the pouring tube. A dome-shaped closure cap 269 is threaded onto the outside surface of wall 270 which forms the return channel. This closure cap is advantageously formed with a downwardly and outwardly turned bead 271 which presses against the inner surface of wall 270 when the cap is in place and serves the same function as the bead 261 at the base of the pouring tube. Bead 271 is not wide enough to block off the channel and prevent liquid draining from the spout reaching the channel. The portions 273 of the closure cap are thick to prevent the threaded sides of the cap from being bent outwardly when it is screwed onto the wall 270.

Spout 275 in Fig. 29 is designed for the bottle 276 which is of a type now commonly employed to ship certain chemicals. The upper portion 277 of the neck of this bottle is of smaller diameter than the lower portion and on the outside surface above the threads 278 there is a V-shaped groove 280. The spout is formed with a flat flange 281 which projects outwardly from the wall 282 which forms the run-back channel. The outer portion 284 of this flange is turned downwardly and is provided with a V-shaped bead 286 which fits into the groove 280 on the neck. The wall 282 fits closely against the inside surface of the narrow portion of the neck and at the base of the wall there is an outwardly flaring bead 289 which presses against the wider portion of the neck. The spout is fastened to the bottle by pressing this wider portion 289 through the narrower portion and snapping the bead 286 into its complementary groove 280. The spout is provided with a baffle 290 and may be covered by a dome-shaped closure cap which threads onto the threads 278 around the neck.

Fig. 30 shows a side elevation of a ceramic teapot with a portion broken away to show the details of a liquid-return spout formed integrally with the regular spout 290 of the teapot. The spout includes a pouring tube 291 surrounded by liquid-return channel 292 which is formed by the wall 293. The pouring tube 291 is provided with a pouring lip 294 at its front edge and an opening down the back. The return channel is shallow under the pouring lip and the liquid which drips from the lip is collected in this shallow portion and flows down the channel to the opening where it is emptied into the spout of the teapot. A baffle 296, as previously described, is formed below the opening in the pouring tube. The chief function of the baffle here is to prevent liquid which is poured out of the teapot from flowing into the return channel since sufficient air is admitted through the top of the teapot to provide a smooth stream. Any suitable baffle arrangement may be used at any level below the opening at the back of the pouring tube to limit the liquid flowing through the spout so as to prevent liquid from entering the channel through this opening.

Figure 31:
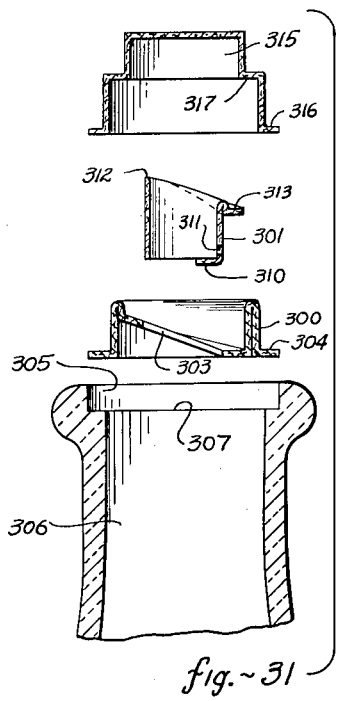

Fig. 31 shows a preferred spout for a milk bottle or the like. The wall and channel portion 300 and the outlet passage 301 of this spout are formed as separate elements. Each is preferably formed of stiff fibrous paper which when wetted may be pressed into the desired shape. After the elements are assembled, they are coated with paraffin or the like to make the spout moisture proof.

The wall portion 300 may be formed by folding a paper tube inside itself. The bottom of the channel is formed by bending the top of the tube inwardly so that it forms an interior ledge 303 which slants downwardly around the inside surface of the wall, leaving a vertical passageway through the tube. The bottom of the tube is bent outwardly to form a flange 304 which is adapted to be snapped into the annular opening 305 in the top of the bottle 306 and to rest on the ledge portion 307.

The outlet passage 301 is formed from another tube, and baffle 310 is formed integrally with the passage when the passage is shaped. The baffle is then folded horizontally and sealed across the bottom of the outlet. An opening 311 is cut through the wall of the passage just above the baffle to drain liquid from the channel into the bottle. The upper edge 312 on the side of the outlet opposite the baffle is beveled outwardly to form a pouring lip. The portion of the upper edge of the outlet around the side above the baffle is rolled back and then turned outwardly as at 313.

Figure 32:
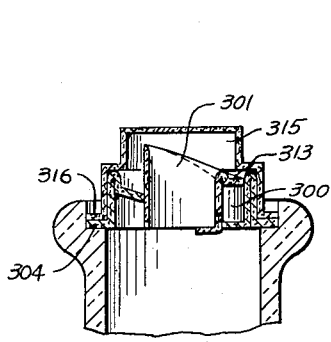
Fig. 32 is an assembly view of the elements shown in Fig. 31.

The wall element 300 and outlet passage 301 are assembled and paraffined. When assembled the outwardly turned portion 313 presses against the top of wall 300 to give the outlet stability. The paper is relatively stiff so that the two elements fit tightly together and the paraffin or other suitable wax-coating seals them firmly. When inserted into the neck of a bottle (Fig. 32), flange 304 presses tightly against the walls of the annular opening of the bottle 305 in the same manner that a conventional milk bottle cap is held in a bottle.

The spout is covered by a dome-shaped cap 315, the lower edge of which is provided with an outwardly directed flange 316 which also snaps into the annular opening 305 to cover the spout. The step portion 317 on this cap seats itself on the top of the wall 300 of the lower section and forms a tight seal. The cap also is advantageously formed of pressed paper and is paraffin coated.

Figure 33:
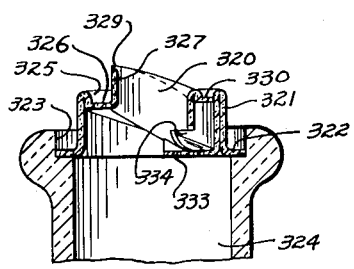
Fig. 33 is a cross-sectional view of another pressed paper pouring spot for a milk bottle.

Another spout 320 for a milk bottle or the like and which is also formed of pressed paper, and then paraffined, is shown in Fig. 33. The elements of this spout are formed as a unit rather than in two separate portions as is the spout of Fig. 31. Spout 320 is advantageously formed from a tube the diameter of which is equal to the diameter of the outermost wall 321 of the spout. The lower edge of this tube is flared outwardly to form a flange 322 which is adapted to snap into the annular opening 323 to fasten the spout into the neck of the bottle 324. The tube is folded inside itself at 325 and then is bent inwardly at 326 to form the downwardly slanted bottom of the run-back channel. The tube is then bent upwardly at 327 to form the outlet passage for the spout. The upper edge 329 of the pouring outlet just above the highest point of the channel is shaped into a pouring lip. Opposite the pouring lip the tube is rolled down and is then bent outwardly at 330. This portion 330 contacts the top of the wall 321 and encloses the back of the channel and makes the pouring tube rigid. Baffle 333 is formed by cutting across the rear of the lower portion of the pouring outlet 327 and folding the cut portion horizontally instead of vertically, and fastening it across the bottom of the pouring outlet. Liquid collected in the channel drains back into the outlet passage through the opening 334 from which the baffle was cut. The baffle is dished slightly at its center to prevent liquid from puddling in the bottom of the channel. This spout may be covered by a cap similar to the cap 315 shown in Fig. 31.

The spouts of Figs. 31 and 33 are designed as throwaway items and paper is probably the most economical material from which to form them. The tubes from which these spouts are made may be extruded from pulp or formed from flat sheets in any suitable manner. Suitable machinery may be developed to shape these spouts on a production basis. The use of these spouts is not limited to a milk bottle. They may be used for bottles containing any relatively fluent liquid.

Figure 34:
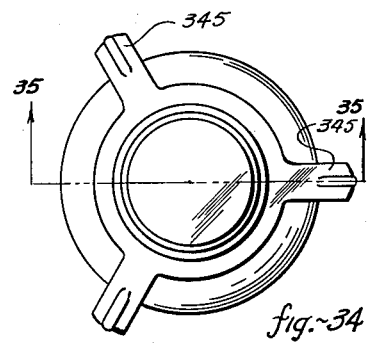
Fig. 34 is a top view of a milk bottle spout adapted to fit all sizes of milk bottles.
Figure 35:
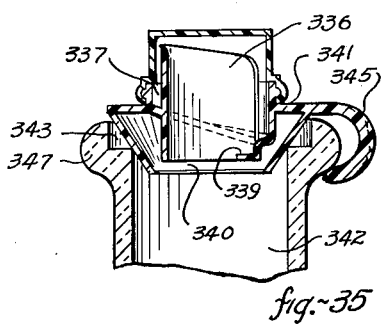
Fig. 35 is a cross-sectional view on the line 35—35 of Fig. 34.

Figs. 34 and 35 show a plastic adapter designed to fit any of the conventional sizes for milk bottles presently in use in this country. The diameter of the neck opening for conventional sizes of milk bottles ranges from about 36 millimeters for pint and quart bottles to about 58 millimeters for gallon jugs. This adapter is similar to the others previously described in that it is provided with a pouring tube 336, a channel 337 surrounding the pouring tube and a baffle 339 at the base of the pouring tube. In order to accommodate milk bottles of various sizes a skirt 340 is provided which tapers downwardly and inwardly from a lateral wafer section 341 around the wall which forms the channel. The skirt is thin and flexible. It fits inside the neck of bottle 342 and is seated tightly against the edge of the ledge 343 just inside the neck. The skirt is tapered so that it will fit into any conventional size milk bottle in this manner. It is fastened to the bottle by the arms 345 which extend laterally outwardly from the top of the skirt. The outer portion of each arm is curved downwardly and inwardly and embraces the bead 347 around the top of the milk bottle. The arms may be snapped over the bead to remove the adapter from the bottle. There are three of the arms 345 located about 120° apart. It is apparent that any number of arms may be used.

The drawings indicate that numerous modifications of these spouts may be had, depending on the purpose and the types of vessels with which they are to be used. The skirts may be made of any size and will be shaped to accommodate various bottle threads, and washers or spacers may be used inside the skirt to adapt it to bottles other than the type for which it was designed. The spout is easily cleaned and is of rugged construction. The outlet passages may be of any cross-sectional shape but preferably the wall forming the channel is circular so that it can receive a closure cap which may be held by threads, a bead, friction, etc.

Although it is necessary to provide an opening at the back of the outlet passage for returning liquid from the channel to the interior of the bottle, it is not necessary that this opening be in the form of a slot extending from the top to the bottom of the outlet passage. Any one or more openings large enough to handle the volume of liquid will be satisfactory. If the spouts are molded, it is more practical to slot the outlet passage than to provide any other type of opening.

Preferably, these spouts are molded from plastic, since they may be inexpensively manufactured in multi-cavity molds. It is recognized, however, that the spouts can be made of pottery, glass or even metal.

Various other modifications of the spouts and molds described herein may be made within the scope of the appended claims.

This application is a division of my application Serial No. 130,432 filed December 1, 1949, now U. S. 2,601,039.

What I claim is:

1. An adapter for a vessel containing liquid, which comprises an outlet passage along one side of which liquid is adapted to flow during a pouring operation, the opposite side of the outlet passage being open at least toward the lower portion thereof, a wall surrounding the outlet passage, a channel between said wall and the outlet passage which leads to said opening, the bottom of the channel at the opening being lower than any other portion of the channel's bottom when the vessel is in the upright position, and a removable closure cap having a portion of its inner surface forming a seal with the top surface of the wall.

2. The adapter of claim 1 in which the removable closure cap is made of stretchable plastic and the lower portion of the cap is reinforced to prevent stretching.

3. An adapter for a vessel containing liquid, which comprises two outlet passages for liquid with a backwardly slanting channel between them which broadens at the front of the spout to receive liquid dripping or overflowing from the pouring lips of the outlet passages, an opening through the rear wall of each passage into the low point of the channel, and means in each passage below the opening which both limits the amount of liquid which can enter the respective outlet passages from the vessel and prevents liquid which flows out through the outlet passages from entering the channel through the respective openings.

4. An adapter for the neck of a vessel containing liquid, which vessel is of flexible plastic, which adapter comprises an outlet passage along one side of which liquid is adapted to flow, the opposite side of the passage being open at least toward the lower portion thereof, a wall surrounding the outlet passage, a channel between said wall and the outlet passage which at its lowest point connects with said opening, two annular projections from the lower portion of the adapter which are adapted to contact the inner and outer surfaces of the outlet of the vessel, the portion of one of said projections which is adapted to make such contact being resilient and directed toward the other projection whereby the projections are adapted to squeeze the outlet between them.

5. An adapter for the neck of a vessel containing liquid, which vessel is of flexible plastic, which adapter comprises an outlet passage along one side of which liquid is adapted to flow, the opposite side of the passage being open at least toward the lower portion thereof, a wall surrounding the outlet passage, a channel between said wall and the outlet passage which at its lowest point connects with said opening, an internally threaded skirt near the lower portion of the adapter adapted to be threaded onto an externally threaded portion of the neck of the vessel, and an annular projection flaring outwardly near the base of said passage and spaced inwardly from the skirt, which projection is adapted to press against the inside surface of the neck when the skirt is threaded onto the outside surface of the neck.

6. An adapter for the neck of a vessel, which adapter is composed of flexible plastic and includes an internally threaded skirt adapted to be threaded onto an externally threaded surface of the neck of the vessel to fasten the adapter to the neck, and fastened to a portion of the adapter within the skirt an annular projection which projects toward the skirt and is adapted to press against the inside surface of the neck a relatively short distance below the rim of the neck when the skirt is screwed onto the threads.

7. A closure formed of flexible plastic material for covering the end of a cylindrical, tubular member formed of flexible plastic, which closure comprises an imperforate center portion adapted to enclose the annular end surface of the cylinder, a skirt around the center portion adapted to embrace the outside surface of the cylinder, threads on the inner surface of the skirt adapted to engage with complementary threads on the outer surface of the cylinder, and an annular projection protruding from the center portion and directed toward the inner surface of the skirt, which projection is adapted to contact the inside surface of the cylinder near the annular end surface thereof when the skirt is threaded onto the cylinder.

8. In combination, a vessel with a tubular opening therein, joined to the opening an adapter with a passage for pouring liquid therethrough and a channel around the passage bounded by a wall, and a closure cap removably fastened to the wall over the upper end of the passage and having a portion of its inner surface forming a seal with the top surface of the wall whereby the combination is liquid tight; said channel slanting to one side of the adapter where there is an opening in the passage through which liquid in the channel drains into the vessel when the combination is upright.

9. In combination with a vessel having a tubular opening, an adapter with a passage therethrough and a lateral flange extending outwardly from all sides thereof, the flange resting over the end of the opening with the adapter extending down into the vessel, a liquid-tight removable cap at the bottom end of the adapter, a liquid-tight wafer over the flange, and fastened to said opening in the vessel a cap with an opening in the center large enough to accommodate the portion of the adapter below the flange, with the edge of the cap adjacent the opening holding the wafer against the flange and the flange against the end of said opening in the vessel.

10. A two-part adapter, the outer part being tubular and doubled over at the top with the inner portion forming an annular channel slanting from one side of the tube to the other, the inner part likewise being tubular and forming a tight fit within said channel and with its upper end on one side bent outwardly and contacting the outer part above the lowest part of the channel, there being an opening through said side just above said lowest part of the channel.

11. The adapter of claim 10 in which the outward part below said opening has a portion bent inwardly to form a baffle which prevents liquid flowing out through said opening when the adapter is in use.

12. An adapter for a tubular opening with a bead on the outer surface thereof, a passage through the adapter for pouring liquid therethrough, a truncated conical surface tapering downwardly around the passage and adapted to contact the inner perimeter of the opening, and arms extending outwardly from the adapter with their outer ends turned inwardly to engage the under surface of the bead when the conical surface contacts the inner perimeter of the opening.

13. In combination with a vessel having a neck and threads externally thereof, an adapter frictionally engaged in the neck and formed with a flange which extends over the end of the neck of the vessel, which adapter has a hole therethrough for the pouring of liquid and a pouring lip in the upper portion thereof, and a cap threaded internally with its threads engaged with said threads on the vessel and having a portion of its inner surface pressing the flange into sealing contact with the end of the vessel.

14. In combination with a vessel having a neck, an adapter of flexible plastic with a hollow portion thereof engaged in the neck with the outer surface of said hollow portion contacting the inner surface of the neck some distance from the top of the neck, the inside diameter of the neck immediately above said point of contact being of smaller diameter than the inside diameter thereof at the point of contact, with means for positioning the adapter in the neck of the vessel with its said portion which contacts the inner surface of the neck positioned immediately below said portion of the neck of smaller diameter.

15. In combination with a vessel having a neck, a polyethylene adapter with a hollow portion thereof engaged in the neck with the outer surface of said hollow portion contacting the inner surface of the neck some distance from the top of the neck, the inside diameter of the neck immediately above said point of contact being of smaller diameter than the inside diameter thereof at the point of contact, with means for positioning the adapter in the neck of the vessel with its said portion which contacts the inner surface of the neck positioned immediately below said portion of the neck of smaller diameter.

16. An adapter designed to fit into an opening in a container, which adapter has a passage therethrough, and a pouring lip at the front of the outer end of this passage, a channel around the passage which drains from the front under the lip to the rear, and under the channel a flexible wall the outer surface of which is adapted to fit into said opening, said wall being spaced outwardly from the portion of the adapter which immediately surrounds the passage, so that flexure of the wall on insertion of the adapter in the opening in the container does not distort the wall of the passage.

(References on following page)

References Cited in the file of this patent

UNITED STATES PATENTS

| | | |
|---|---|---|
| 832,282 | Wall | Oct. 2, 1906 |
| 2,413,438 | Doose | Dec. 31, 1946 |
| 2,601,039 | Livingstone | June 17, 1952 |
| 2,605,937 | Bradley | Aug. 5, 1952 |

FOREIGN PATENTS

| | | |
|---|---|---|
| 282,571 | Great Britain | Dec. 29, 1927 |
| 271,339 | Switzerland | Jan. 16, 1951 |